United States Patent [19]

Walther et al.

[11] 4,307,896

[45] Dec. 29, 1981

[54] SEMI-TRAILER LANDING GEAR

[75] Inventors: William D. Walther, Kettering; Vicente M. Lozada, Centerville, both of Ohio

[73] Assignee: Dayton-Walther Corporation, Dayton, Ohio

[21] Appl. No.: 101,601

[22] Filed: Dec. 10, 1979

[51] Int. Cl.³ .............................................. B60S 9/02
[52] U.S. Cl. ................................. 280/766; 254/86 R
[58] Field of Search .............. 280/766, 765, 764, 763, 280/43, 43.2, 43.21, 43.23; 254/86 R, 86 H; 228/173 B, 173 C, 173 F

[56] References Cited

U.S. PATENT DOCUMENTS

| D. 190,564 | 6/1961 | Homan | D14/6 |
|---|---|---|---|
| 1,895,133 | 1/1933 | Quarnstrom | 228/173 B |
| 2,100,901 | 11/1937 | Harris | 228/173 F |
| 2,815,962 | 12/1957 | McKay | 280/766 |
| 3,236,341 | 2/1966 | Chopinet et al. | 228/173 B |
| 3,738,613 | 6/1973 | Hollis | 254/86 R |
| 4,124,225 | 11/1978 | Lozada et al. | 280/763 |

FOREIGN PATENT DOCUMENTS 330062  8/1903  France ................................ 280/766

OTHER PUBLICATIONS

"Homan Husky" Brochure, Homan Division of Dayton-Walther Corporation, Product Bulletin H7402.

Primary Examiner—David M. Mitchell
Attorney, Agent, or Firm—Biebel, French & Nauman

[57] ABSTRACT

Landing gears for semi-trailers or the like are disclosed in which the telescoping outer and inner legs of the landing gear are formed as a pair of identical, generally U-shaped sheet metal members which are welded along overlapping seams to form generally box sections. The inner legs are formed with vertical inwardly indented corrugations formed in the end and side walls thereof for added strength. In another embodiment, the outer leg is also formed with corrugations which interfit within the corrugations formed in the inner leg.

2 Claims, 6 Drawing Figures

FIG-1 FIG-3
FIG-2 FIG-4
FIG-5 FIG-6
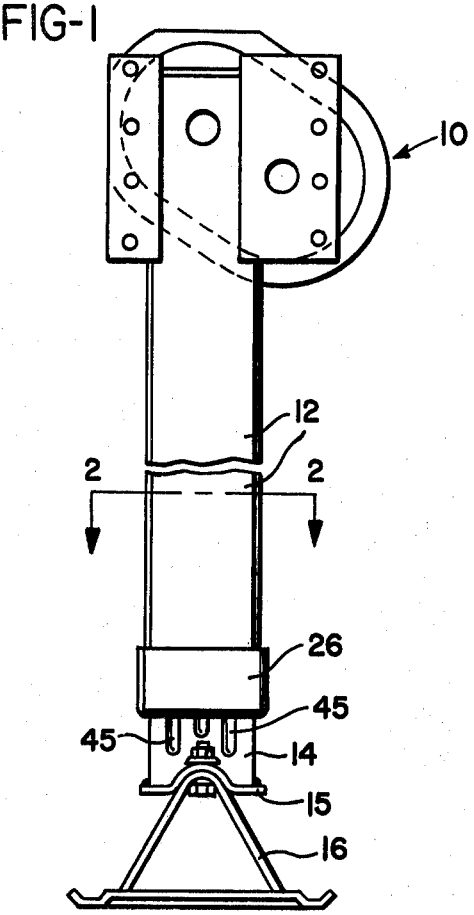
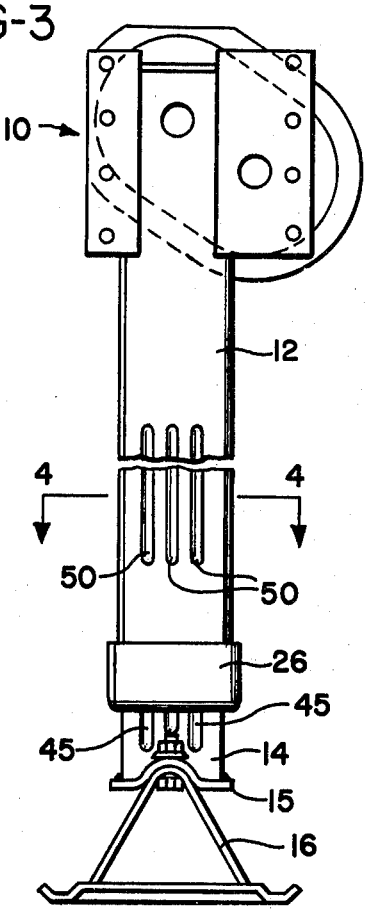
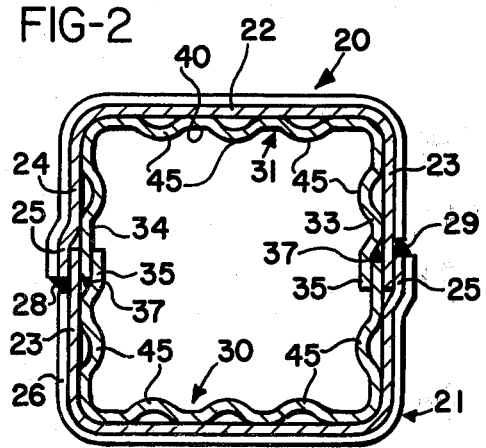
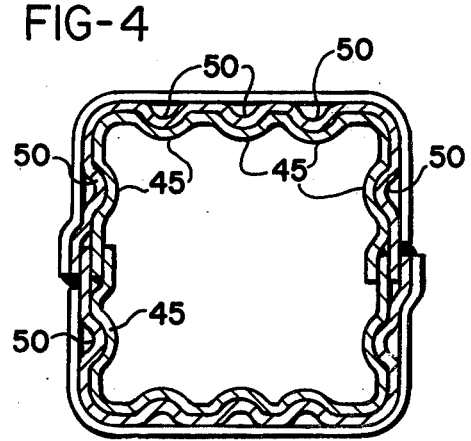

SEMI-TRAILER LANDING GEAR

BACKGROUND OF THE INVENTION

The invention herein is related to landing gears for semi-trailers and the like. Commonly, such landing gears are formed with interfitting box-section supporting legs, as shown for example, in the U.S. patent of Lozada et al, U.S. Pat. No. 4,124,225 issued Nov. 7, 1978 and assigned to the same assignee as this invention. Commonly, such landing gears must withstand, in testing, a 70,000 pound static load without collapsing or failure. Further, a pair of such landing gears must commonly be capable of lifting a 50,000 pound load. Landing gears made with conventional box-section legs as shown in U.S. Pat. No. 4,124,225 have commonly had legs formed of square tubing with a thickness of 0.185", in order to provide the necessary strength.

Another landing gear leg which has been successfully used is the corrugated oval form as shown in the U.S. Pat. No. Des. 190,564 of Homan, issued June 13, 1961. In that construction, the inner and outer legs are formed of a generally oval corrugated design, but with non-interfitting corrugations. This construction is light-weight and strong, but is expensive to manufacture. The corrugations are not arranged in complementary fashion or otherwise interfit or cooperate to increase strength and rigidity.

SUMMARY OF THE INVENTION

The present invention is directed to landing gears having improved leg constructions, in which a box-like inner leg is telescopically interfitted with a box-like outer leg. Each of the inner and outer legs is formed as an opposed pair of generally U-shaped sheet metal members, in which the members which make up the inner leg are telescopically fitted for movement within the members which made up the outer leg. In each embodiment of the invention, in order to provide additional strength and to reduce the weight of material required, the side walls of the inner leg are formed with vertically elongated, inwardly extending corrugations. The remaining non-corrugated portions of the complementary parts making up the inner leg forms a close running fit with the inside surface of the outer leg.

In another embodiment, the outer leg, for a portion of its length, is also formed along its side walls with inwardly extending corrugations complementary to the corrugations formed in the inner leg and thus, for the extent of the corrugations formed in the outer leg, the inwardly extending portions of these corrugations are complementary received within the inwardly indented spaces defined by the corrugations in the inner leg.

The construction of the landing gears of this invention permits the employment of lighter weight material or a material which is substantially thinner in wall thickness than that formerly employed, to achieve the same or greater load bearing strength. A savings of over three pounds weight per landing gear unit may be effected by the employment of the construction as defined in this invention over that of the use of square tubing, as shown in the above-mentioned U.S. Pat. No. 4,124,225.

Accordingly an important object of this invention is to provide improved landing gears which have an inner leg formed of channel-shaped members connected to form a box-like section in which the member walls are vertically corrugated or formed with vertically extending indentations.

Another object of the invention is the provision of an improved leg construction, as outlined above, for a landing gear having improved strength and having a lighter weight as compared to a non-corrugated box-section landing gear leg.

A still further object of the invention is the provision of a leg construction for a landing gear in which the inner and outer leg members are provided with interfitting vertically elongated corrugations in the side walls of the leg members.

These and other objects and advantages of the invention will be apparent from the following description, the accompanying drawings and the appended claims.

BRIEF DESCRIPTION OF THE DRAWINGS

FIG. 1 is partially broken away side elevation of a landing gear constructed according to one embodiment of the invention;

FIG. 2 is a transverse section through the landing gear legs taken generally along the line 2—2 of FIG. 1;

FIG. 3 is a further partially broken away side elevation of a landing gear constructed according to a slightly modified form of the invention in which corrugations are formed in the side walls of the outer leg;

FIG. 4 is a transverse section through the landing gear legs of the embodiment of FIG. 3 taken generally along the line 4—4 of FIG. 3; and FIGS. 5 and 6 are respectively transverse fragmentary sections through the end walls of further modified forms of the channel parts making up the leg members of the landing gear.

BRIEF DESCRIPTION OF PREFERRED EMBODIMENTS

Referring to the drawings, which illustrate preferred embodiments of the invention, landing gears constructed according to the invention are illustrated in FIGS. 1 and 3 as having a drive or gear mechanism 10 at the upper end thereof, fixedly or rigidly supporting a box-like outer leg 12 in depending relation therefrom. The gear drive portion 10 may preferably include a two-speed gear reduction mechanism constructed according to the U.S. Pat. No. 3,892,141 of Phillips, Jr., et al, issued July 1, 1975. Alternatively, the gear reduction drive portion 10 may be constructed in accordance with the teachings of the copending application of Walther et al, Ser. No. 910,832 filed May 30, 1978.

A box-like inner leg 14 is telescopically received within the outer leg 12 for lifting and lowering movement by the drive portion 10. The lower end of the inner leg is, preferably, provided with a transverse saddle plate 15 which may receive a ground engaging element, such as the sandshoe 16 which may be constructed in accordance with the teachings of the above-defined U.S. Pat. No. 4,124,225. Alternatively, the lower leg 14 may support ground engaging wheels.

The further details of the construction of the inner and outer legs employed with the embodiment of FIG. 1 are shown by the cross-sectional view of FIG. 2. The outer leg 12 is constructed of an elongated pair of essentially identical, interfitted and opposed generally U-shaped sheet metal leg halves which may be considered as a pair of U-shaped metal leg sections or members 20 and 21. The identical leg members 20 and 21, which make up the outer leg 20, are formed with relatively longer flat side walls 22 and somewhat shorter upstanding end walls 23 and 24. The end walls 24 are somewhat longer than one-half the spaced apart distance between the opposite side walls 22. The wall 23 is formed with an outwardly offset marginal vertical edge 25 for receiving and partially overlapping the adjacent vertical edge of the opposite end wall 23 of the opposite member 21, to form a box-like outer leg 12.

Further, the bottom or lower terminal end of the outer leg 12 is formed with an upwardly folded cuff or skirt portion 26. The skirt portion 26 actually comprises a corresponding portion of each of the leg members 20 and 21 which is tightly folded back upon itself and assumes the same overall configuration as that of the underlying major portion of the member. The skirt portion 26 of each of the leg members 20 and 21 is thus folded back before the individual leg members are stamped into their generally U-shaped configuration and the stamping thus assures a tight fold. The cuff portion 26 provides additional strength to the lower end of the outer leg.

The individual U-shaped members or sections 20 and 21 which make up the outer leg are seam welded as indicated at the welds 28 and 29 along their exposed vertical joints to join these parts together in a permanent unitary box-like structure. The cuff 26 is similarly welded by the welds 28 and 29 at the adjoining seams of the cuff 26.

The inner leg 14 is also formed from a pair of generally identical U-shaped sections 30 and 31. The outer dimension of the inner leg is proportioned so as to form a close sliding fit within the inside dimension of the outer leg 12. Each of the inner sections 30 and 31 is formed with a side wall 32 and a pair of upstanding parallel spaced apart end walls 33 and 34. The end wall 33 is formed with an inwardly offset extending terminal edge or end 35, the outer surface of which overlaps the inside surface of the end of the opposite end wall 34. The inner leg sections 30 and 31 are then seam-welded as indicated by the welds 37 to form a permanent and unitary box-like section proportioned to be received within the outer leg 12.

For the purpose of adding strength to the inner leg 14, the side walls 32 as well as the end walls 33 and 34 are formed with inwardly indented or extended vertical corrugations, which extend along the major length of the respective sections. Preferably, three of the vertically extending inwardly indented corrugations 45 are formed on the side walls of the sections 30 and 31 and a single corrugation 45 is formed on the end walls 33 and 34. The corrugations 45 which are formed in the walls of the inner leg provide substantial strength to this leg. Further, the overlapped edge portions of the inner leg members are positioned in vertical alignment, but in non-interferring relation, with the corresponding overlapped edge portions of the outer leg members, and these overlapped portions add further strength to the leg assembly.

It has been found that the legs of this invention may be formed of somewhat thinner and lighter sheet material than was formerly possible, to achieve the same weight bearing capacity. For example, rather than employing material having a thickness of 0.185" as is the customary practice, the construction of the present invention permits the use of a somewhat thinner and lighter weight material having a wall thickness of 0.157". Preferably, hot rolled, pickled and oiled sheet steel conforming to SAE 1022, 1025 or 1522 with a Rockwell hardness of B68 to B82 may be used. The resulting construction is one which is as strong as if not stronger, than the one which it replaces, and yet provides a weight savings of approximately 3.3 pounds per landing gear.

When desired, the outer leg members 20 and 21 may also be provided with interfitting corrugations which extend at least partially throughout the length of the outer leg, to provide additional strength and further to provide guiding surfaces for support of the inner leg. FIGS. 3 and 4 show an embodiment of the invention in which the outer leg members 20 and 21 are provided with inwardly indented corrugations 50 formed in the side walls and end walls thereof, in interfitting relation with the outside surfaces defined by the corrugations 45. Thus, while the corrugations 50 formed in the outer leg 12 extend only partially of the axial overall length of the leg, and may terminate from five to twelve inches from the lower end, they are complementary to the corresponding indentations formed in the inner leg 14 and, for this purpose, are formed with a somewhat smaller radius of curvature so that the inner surfaces thereof correspond to the outer surfaces defined by the corrugations 45. In all other respects, the landing gear leg construction and arrangment shown in the embodiments of FIGS. 2 and 3 are identical to the construction and arrangement of the parts described in detail above in connection with FIGS. 1 and 2.

FIGS. 5 and 6 are fragmentary sections on a somewhat enlarged scale showing modified side walls at the seam portions of the inner and outer legs.

The embodiments shown in FIGS. 5 and 6 illustrate arrangements by which the sections or members making up the inner and outer legs may be butt welded to form the unitary box-like sections in lieu of the overlapping seam welds illustrated in connection with the embodiment of FIGS. 2 and 4. Referring first to FIG. 5, the side walls 23a and 24a of the channel-shaped sections forming the members of the outer leg 12 are terminated in outwardly rolled or turned abutting ends 60 which are butt welded together by an outside vertical weld or seam 62. Similarly, the side walls 33a and 34a of the inner modified sections forming the leg 14 are terminated in slightly inwardly curved abutting ends 64 which are welded along an outside vertical weld or seam 65. In FIG. 6, the terminal ends 60a of the outer members are brought into flat or co-planar abutting relation and joined by an outside weld or seam 62a, while the inside wall members are joined in the same manner as illustrated and described in connection with FIG. 5.

While the forms of apparatus herein described constitute preferred embodiments of this invention, it is to be understood that the invention is not limited to this precise form of apparatus and that changes may be made therein without departing from the scope of the invention.

What is claimed is:

1. An improved light weight landing gear for semi-trailers and the like having a box-like outer leg and a box-like inner leg slidably received within said outer leg, the improvement comprising each of said legs being formed as an opposed pair of U-shaped sheet metal members, with the members comprising said inner leg fitted within the members comprising said outer leg, at least said inner leg having two opposite pairs of walls each formed with vertically elongated, inwardly extending corrugations and the members of said inner leg having edge portions overlapped along a vertical seam inwardly of the outer surface thereof, and the members of said outer leg having edge portions overlapped along a vertical seam outwardly of the major outer dimensions thereof so that said overlapped portions of said legs are in adjacent and non-interferring relation when said inner leg is assembled within said outer leg.

2. The landing gear of claim 1 in which said outer leg is formed with inwardly extending corrugations in the four walls thereof in interfitting relation with the corresponding corrugations formed in said inner leg.

* * * * *